United States Patent [19]

Jacobson

[11] Patent Number: 4,934,783
[45] Date of Patent: Jun. 19, 1990

[54] OFF-AXIS FIBER OPTIC ROTARY JOINT

[75] Inventor: Peter E. Jacobson, Phoenix, Ariz.

[73] Assignee: Honeywell Inc., Minneapolis, Minn.

[21] Appl. No.: 320,729

[22] Filed: Mar. 8, 1989

[51] Int. Cl.⁵ .............................................. G02B 6/26
[52] U.S. Cl. .............................. 350/96.15; 250/227.11; 350/96.18; 350/96.20
[58] Field of Search ............... 350/96.10, 96.15, 96.16, 350/96.18, 96.20, 96.21, 96.22, 96.24, 96.25; 250/227, 552

[56] References Cited

U.S. PATENT DOCUMENTS

| | | | |
|---|---|---|---|
| 4,109,997 | 8/1978 | Iverson | 350/96.10 X |
| 4,555,631 | 11/1985 | Martens | 250/551 |
| 4,711,516 | 12/1987 | Graber | 350/96.15 |

FOREIGN PATENT DOCUMENTS

| | | | |
|---|---|---|---|
| 60-79303 | 5/1985 | Japan | 350/96.15 |
| 60-79304 | 5/1985 | Japan | 350/96.15 |

Primary Examiner—John D. Lee
Attorney, Agent, or Firm—Seymour Levine; Roger W. Jensen; Albin Medved

[57] ABSTRACT

An optical rotary joint includes a rotating input lens assembly which emits a ray set from a focal point to illuminate a cylindrical reflector. Rays reflected from the cylindrical reflector pass through another focal point and are reflected from the cylindrical reflector to pass through still another focal point. This reflection and focusing continues until the ray paths are incident to a window in the cylindrical reflector and exit. Exiting rays are focused by a lens arrangement which focuses the rays to an output optical fiber.

17 Claims, 6 Drawing Sheets

OFF-AXIS FIBER OPTIC ROTARY JOINT

BACKGROUND OF THE INVENTION

1. Field of the Invention

The present invention relates generally to fiber optic data transfer devices and, more particularly, to an optical rotary joint that provides a low loss multi-channel one-directional through-put capability with unlimited bi-directional rotation.

2. Description of the Prior Art

Fiber optic techniques make possible many useful devices for transmitting data with modulated light waves. Many types of fiber materials and designs are available to transfer data modulated optical signals over long distances with very low signal attenuation. In addition to signal attenuations over the fiber length, losses occur at terminations and sharp bends. Signal attenuations not only reduce the signal level, they adversely effect the modulation frequency of digitized data carried by the optical waves. Consequently, it is desirable to minimize the system losses.

Often it is necessary to transfer a modulated light beam between two fibers, one rotating with respect to the other. To accomplish such a transfer, a special component referred to as a Fiber Optic Rotary Joint (FORJ) is required. Such devices must be designed for low optical loss operation and minimum loss variation as a function of rotation angle. Further, it is desirable that the FORJ be passive, not having optical components that require external power, and be bidirectional, permitting the transfer of light beams in both directions.

A configuration of a FORJ of the prior art includes single fibers on either side of the rotary joint having a common axis on the axis of rotation. Such devices may exhibit losses as low as 3 dB. Since the fibers are generally single mode, these devices can provide multi-channel capability only with the utilization of appended complex time multiplexing components. Consequently, the maximum data rate that on-axis FORJs can handle is limited by the data handling capability of the time multiplexers. These systems cease to be viable options when the data rate requirements exceed the capability of the multiplexers. Additionally, the requirements for dual and triple redundancy render the single on-axis fiber rotary joint unacceptable.

To increase the number of fibers that may be included in a FORJ, side-of-the shaft devices have been proposed. In these systems the fibers are positioned off the rotation axis about the rotating shaft, i.e. to the side-of-the shaft. Optical losses associated with such devices increase as the size of the devices increases. To date, the best loss performance achieved with such systems is between 15 and 30 dB. The transfer of data modulated light through rotary joints at bit rates exceeding 2 Giga bit/sec., present day requirements, necessitates a loss through the joint of less than 10 dB. It is therefore apparent that side-of-the shaft rotary joints do not meet the challenge.

Active off-axis rotary joints exist in the prior art which employ photon to electric converters between one set of fibers and an electrical rotary joint and electric-to-photon converters between the electrical rotary joint and the other set of fibers. Though high signal losses are experienced in the conversion processes these are easily off-set with the use of high gain electrical amplifiers. Such systems are extremely complex, require external electrical power for the converters and amplifiers, and are limited to data transfer rates of $5 \times 10^7$ bits/sec.

SUMMARY OF THE INVENTION

An optical rotary joint in accordance with the principles of the present invention includes a cavity having an internal cylindrical reflector to which a beam of light is incident from an optical input assembly. This beam of light is reflected around the cavity by a multiplicity of point-to-point reflection segments until a segment is incident to a window that is formed by the removal of a section of the cylindrical reflector. An optical lens assembly at the window collects the rays within the beam and directs the light to an output port constructed to accept an optical fiber.

The optical input assembly is constructed and positioned to provide diverging beams from points on a circle that has a predetermined radius and is concentric with the cylindrical reflector. The orientation of the input assembly's light emitting region on the circle is such that one ray in each beam has reflection segments that are tangent to the circle. Reflection segments are of equal length and the number of reflection segments traversed before a beam exits through the window is a function of the angular position of the input assembly when the beam is launched. This number being zero when the angular position is at the location of the window.

DESCRIPTION OF THE PREFERRED EMBODIMENTS

Figure 1:
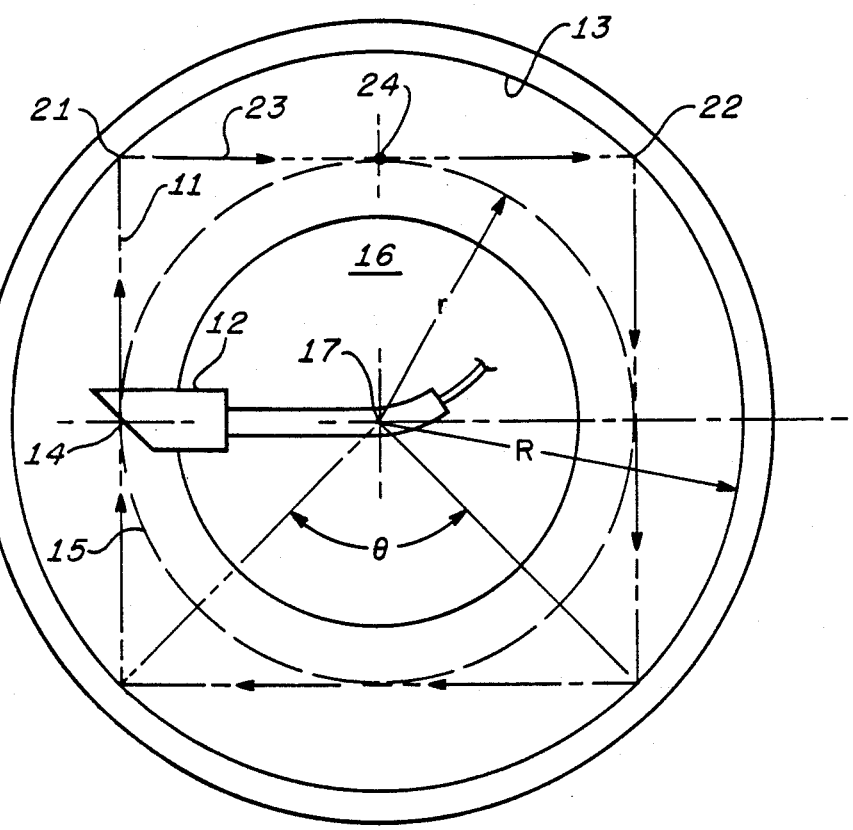
FIG. 1 is a diagram of a cylindrical reflector and an optical input assembly useful for explaining the operational theory of the invention.

Referring to FIG. 1, wherein a ray 11 within a light beam is emitted from an optical input assembly 12 towards a cylindrical reflector 13 of radius R is illustrated. As will be explained, the light beam diverges from a point 14 and the primary ray 11 shown is the one ray that is tangent to a ray tangent circle 15 of radius r. The input assembly 12 is mounted on a carrier 16 which rotates about an axis through the center 17. Ray 11 is reflected from a point 21 on the cylindrical reflector 13 towards a second point 22 to establish the ray path segment which is tangent to the tangent circle at the tangent point 24. Reflections from point 22 and subsequent points on the cylindrical reflector 13 each traverse ray path segments that are tangent to the tangent circle 15, with the final ray path segment ultimately passing through the tangent point 14. Though four segments are shown in the figure any number N of segments may be chosen, each subtending an angle $\Theta = 360°/N$ and having a length $L_s = 2R \sin(\Theta/2)$. As the number of segments increase, the angle $\Theta$ decreases while the radius of the tangent circle 15 increases. It should be apparent from FIG. 1 that the tangent points on the tangent circle 15 are mid-points on the ray path segments, and that $r/R = \cos(\Theta/2)$.

Figure 2:
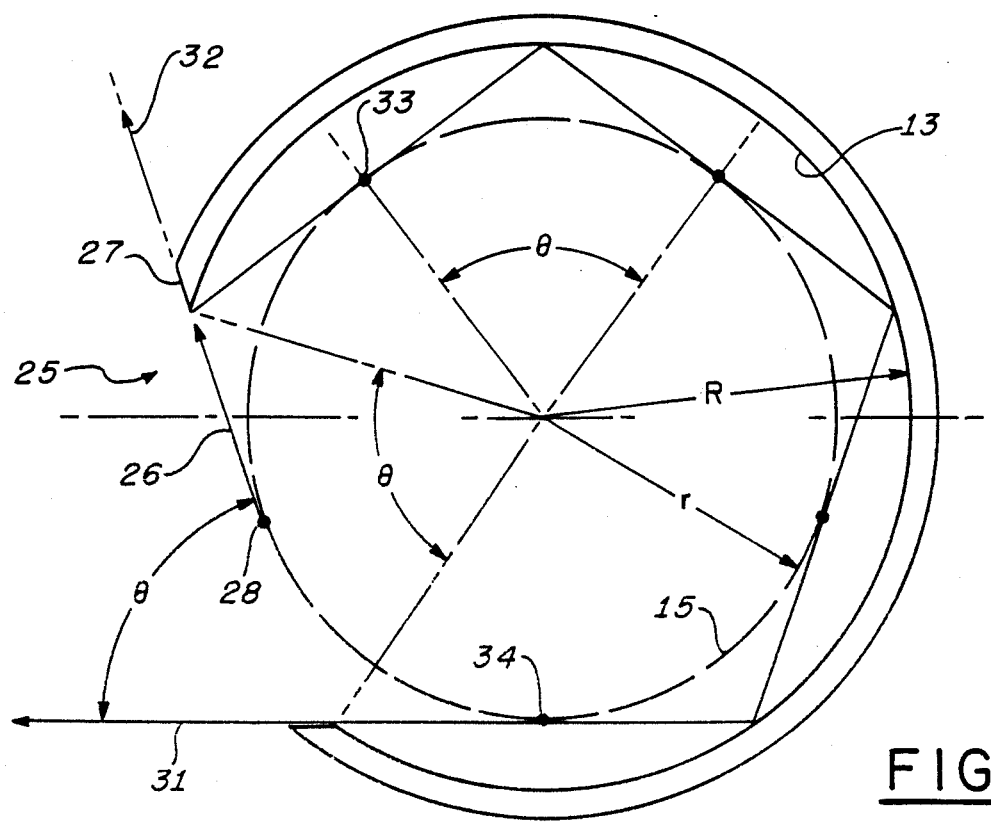
FIG. 2 is a representation of the cylindrical reflector of FIG. 1 illustrating the construction of a window therein.

A window 25, of angular width equal to an angle $\Theta$ corresponding to a ray path segment, may be provided by removing a portion of the cylindrical reflector over an angular range $\Theta$, as shown in FIG. 2. A ray, as for example ray 26, incident to the cylindrical reflector at the edge 27 of window 25 from a tangent point 28 on the tangent circle 15 will traverse one-half of a ray path segment to the cylindrical reflector 13 and (N-1) ray paths thereafter before exiting from the cavity as the ray 31, thereby traversing a total of (N-½) ray path segments. As the optical input assembly 12 (FIG. 1) is rotated the launch point of the tangent ray rotates on the tangent circle 15 and the exit ray is rotated form the initial exit ray 31 by an angle that is equal to the angle of rotation of the launch point. The exit ray continues to rotate with the launch point rotation until the launch point rotates through an angle that is equal to the angle $\Theta$. At that time the exit ray 32 is at an angle $\Theta$ relative to the initial ray 31. Throughout this angular rotation range the launched tangent ray traverses a total of (N-½) ray path segments.

When the launch point rotation angle is infinitesimally greater than $\Theta$, such as the angle of the launch point 33, the exit ray is once again the ray 31. The rotation of the exit ray is repeated until the launch point is once again rotated through an angle $\Theta$. For this second angular rotation sector the ray traverses (N-3/2) ray path segments before exiting through the window 25. Ray paths from the launch point continue to shorten until the launch point reaches an angular rotation section at which the tangent rays exit without reflection, the ray path lengths in this sector being one half a ray path segment. The initial ray of this angular sector is launched from a tangent point 34 from which the launched ray coincides with the exit ray 31. Tangent rays continue to exit without reflection until the launch point rotates through an additional angle $\Theta$, whereafter the launch cycle is repeated.

Since $r/R = \cos(180°/N)$ a difficult design constraint is imposed on the optical input assembly and rotation mount configuration shown in FIG. 1, for r/R approaches unity as N increases. Window 25 (FIG. 2) angles exceeding 40 degrees are difficult to accommodate optically, therefore necessitating that N be greater than 9. For N equal to 9 the radius ratio is 0.94, providing an unacceptable clearance for the rotation of the optical input assembly. This problem may be alleviated with the optical input assembly design and rotation mounting shown in FIG. 3. As depicted in the figure, the central ray 35 of a beam focused to a mirror 36 from an input optical fiber (not shown) is reflected from the mirror as the tangent ray to the tangent circle 15. The input optical assembly 37 is positioned in FIG. 3 such that the tangent ray 38 exits through the window 25 at the largest rotation angle in the window's 25 angular sector, so that the ray exits without reflection along the ray path 41. It should be noted that the window 25 must subtend an angle that is equal to, or greater than the ray path segment angle $\Theta$ to provide exit rays over a full 360° rotation about the tangent circle. It should also be noted that the receiving optics (not shown) will pick up the complete ray set (beam) as the input optical assembly rotates past the edges at both the window start 43 and the window end 44. It should be further be noted, for the optical input assembly shown, that all rays in the ray set to the left of the tangent ray 38 exit through the window without reflection, while all rays to the right of the target ray 38 exit after traversing (N-½) ray path segments.

Figure 3:
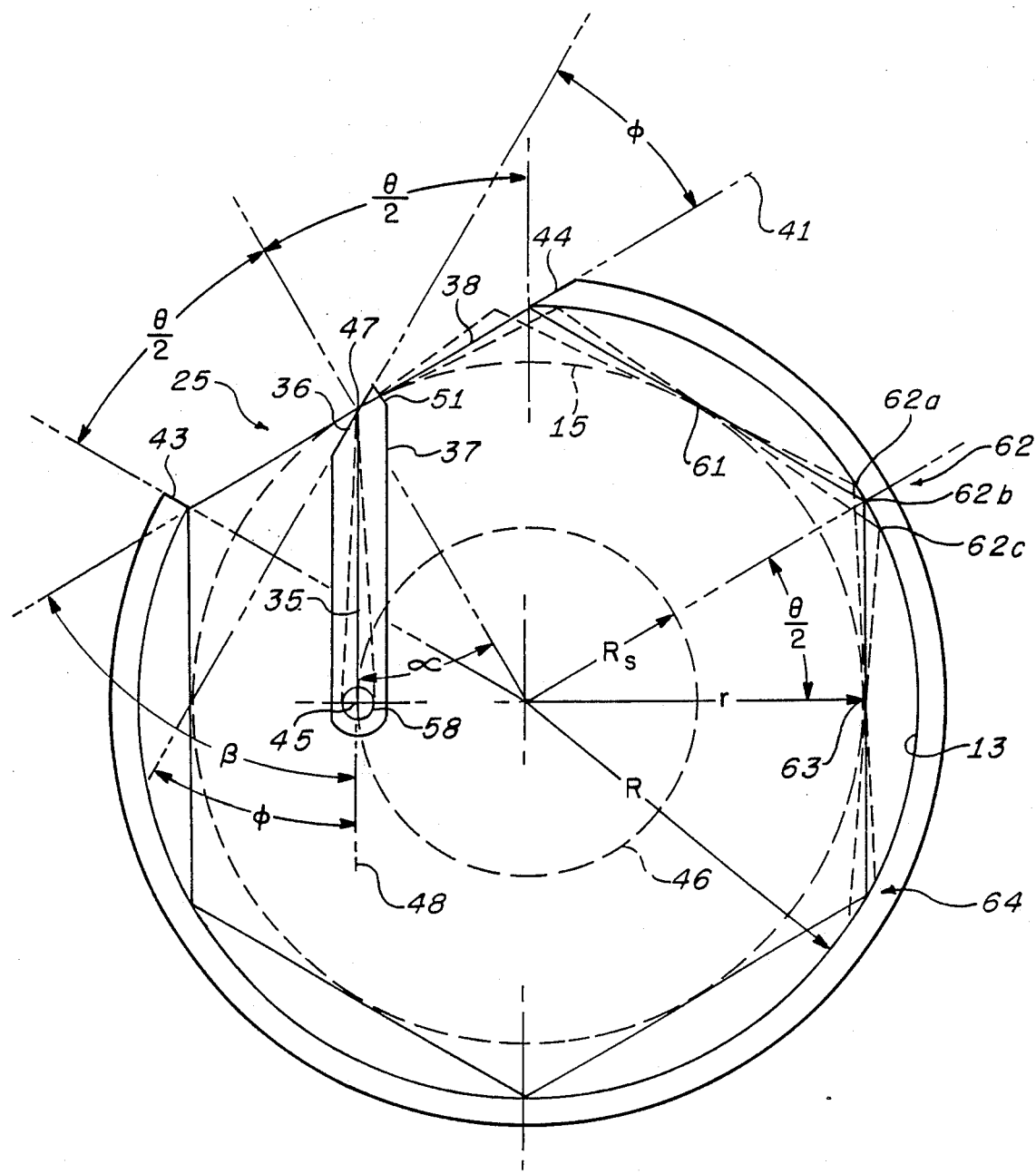
FIG. 3 is a ray diagram useful for explaining internal reflections from a cylindrical mirror.

In FIG. 3 it is shown that the point 45 at the input end of the optical input assembly 37 rotates about a circle 46 of radius $R_s$, while the point of reflection 47, within the optical input assembly 37 of the central ray in the beam, the tangent ray, rotates about the tangent circle 15. As previously indicated the ratio of the tangent circle 15 radius r to the cylindrical reflector radius R is determined from the equation $r/R = \cos(\Theta/2)$, while those skilled in the art will ascertain that the ratio of the rotation circle 46 radius Rs to the radius r is determined from the equation $R_s/r = \cos\beta$, where $\beta$ is the angle of the reflected central ray 38 relative to the axis 48 of the optical input assembly 37. It should be recognized that only one tangent circle may exist for a given set of R and N. Consequently, due to the curvature of the cylindrical mirror 13, a collimated beam emitted from the output window 51 of the optical input assembly 37 will diverge as it traverses the cavity by reflections from the cylindrical mirror 13.

Figure 4:
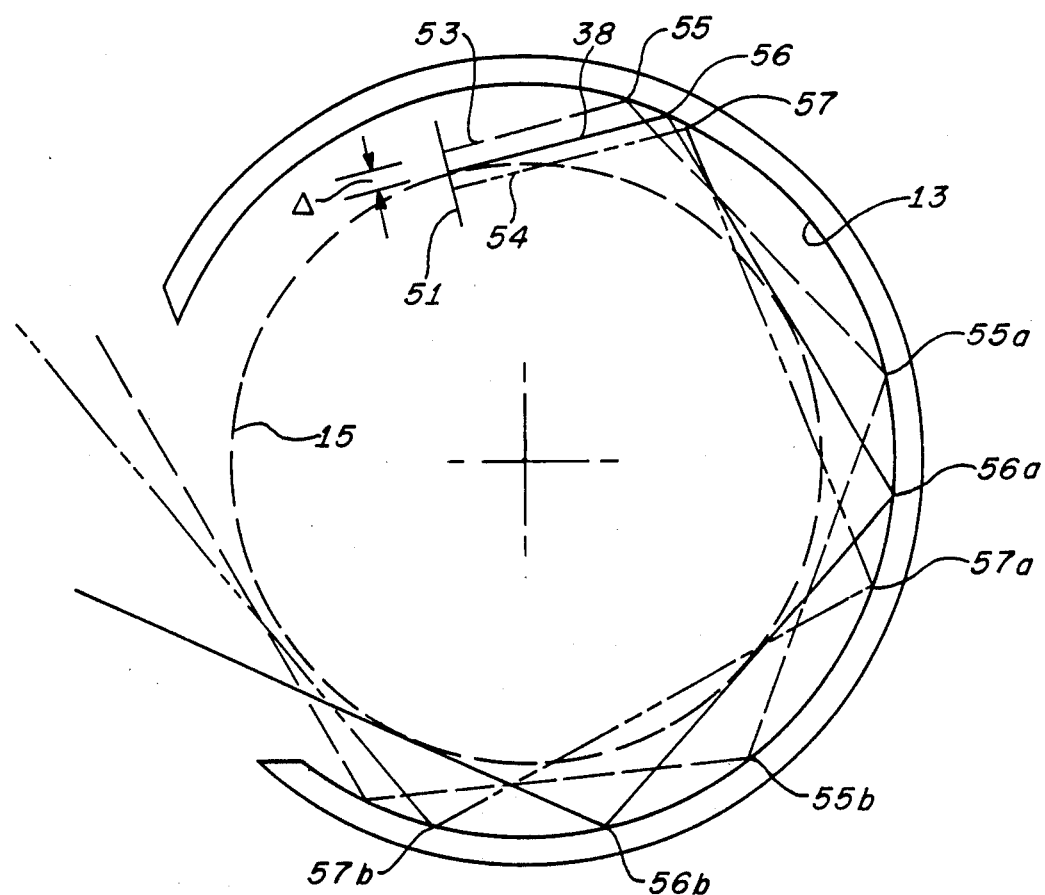
FIG. 4 is a schematic diagram of an optical rotary joint in accordance with the invention.

Consider a collimated beam emitted from the output window 51 of the optical input assembly 37 as represented in FIG. 4. In this figure the outer rays 53 and 54 are each a radial distance $\Delta$ from the central ray of the collimated beam which is the tangent ray 38 to the tangent circle 15. The three rays are incident to the reflector at three different angles of incidence. The ray separation of the extreme rays from the central ray is greater exaggerated in FIG. 4 for purposes of clarity. Extreme rays in a collimated beam emitted from a fiber optic device would be a distance from the central ray that is not greater than the radius of the device. The central ray 38 is incident to the reflector at an angle of 90(N-2)/N degrees, while the upper extreme ray 53 and the lower extreme ray 54 are respectively incident to the reflector at angles $[90(N-2)/N + 57.3\Delta/(R \sin\{180/N\})]$ degrees and $[90(N-2)/N - 57.3\Delta/(R \sin\{180/N\})]$ degrees. Since the angle of reflection equals the angle of incidence and the deviation angles are small a conversion from a collimated beam to a near collimated beam is realized after the first reflection. As indicated in the figure, not only does the beam diverge due to the difference angles of incidence, but the angular distance between the reflection points increase as the beam traverses the cavity. Note the initial reflection point set (55, 56, 57) and the subsequent two reflection point sets (55a, 56a, 57a) and (56b, 55b, 57b).

Referring again to FIG. 3, ray bundles from an optical fiber are coupled through a lens (not shown) and a mirror 58 combination that focuses the rays in planes perpendicular to the axis of rotation to focal points on a line (node) that is parallel to the axis of rotation. These focal points all lie on tangent circles in these planes and are coincident with the tangent points of the tangent rays. All such focal points are represented by the point 47. The focused beams at the mode passing through point 47, are reflected from the mirror 36 to form an image on the cylindrical reflector 13. As shown in FIG. 34 one half the beam exits through the window directly. Consider, however, that the optical input assembly has been rotated so that the image is formed on the reflector. In FIG. 4 the image is represented by the three points on the cylindrical reflector 13 established by the ray emanating from the focal point 47. A divergence angle is chosen such that the image is reflected to form a focus 61 wherefrom the rays once again diverge to establish an image on the cylindrical reflector 13, represented by the points 62a, 62b, and 62c. The image 62 is reflected through a focus 63 on the tangent circle 15 to form another image 64 on the cylindrical reflector 13. This sequence of reflection and focus continues until the rays exit the cavity. Due to the angular symmetry of the system the divergence angles are equal at all focuses and the images are equal at all image regions. Thus, the ray bundles are conservatively folded between each reflecting region, maintaining the divergence angle.

Figure 5A:
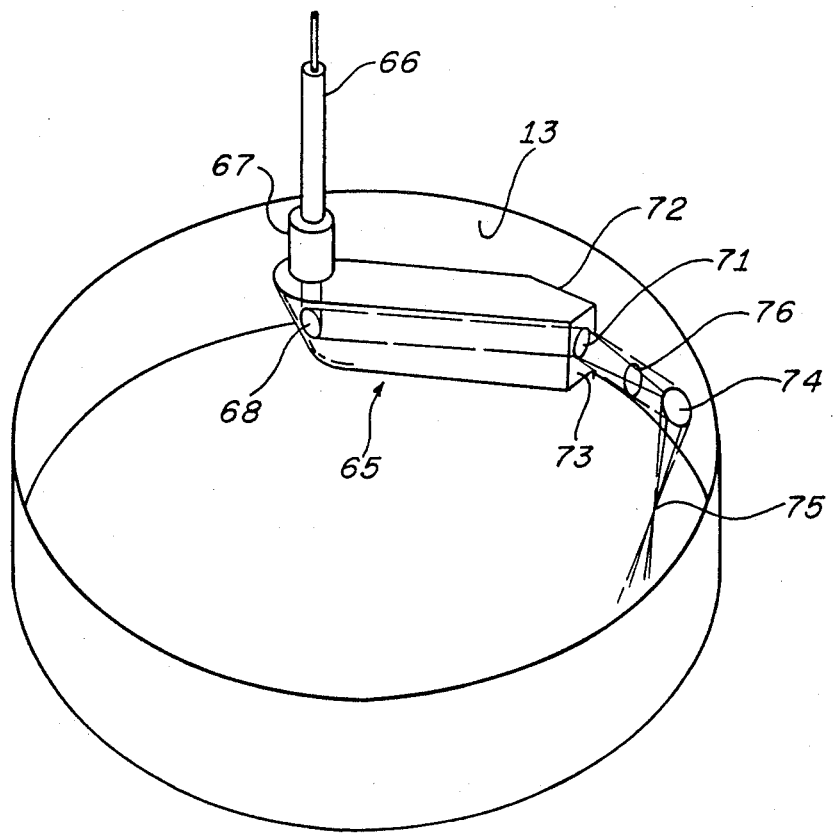
FIG. 5A is a schematic diagram of a lens assembly that may be utilized at the cavity window with ray paths indicated thereon.

Refer now to FIG. 5A wherein an optical input assembly 65 illuminating the cylindrical reflector 13 is shown. Light from an optical fiber 66 is focused by a Grin lens 67 and folded by reflection from mirror 68 to a node 71 on a second mirror 72. The input assembly 65 is designed to position the node 71 on the tangent cylinder. Light rays reflected from the second mirror 72 pass through a window 73 to form an image 74 on the cylindrical reflector 13. Image 74 is reflected from the cylindrical mirror 13 to the next node 75 and the sequence of image and node continues about the cylindrical mirror 13.

Figure 5B:
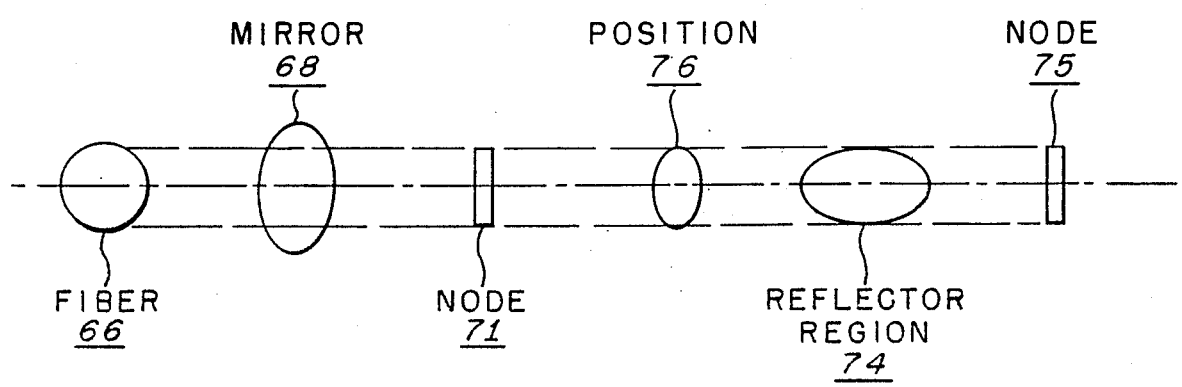
FIG. 5B shows representation of geometric image configurations at locations from an input optical figure to a region of reflection on the cylindrical reflector.

FIG. 5B presents representations of the geometric shapes of the images at various stages of the above described sequence. Below each shape the position of occurrence is indicated by the element title and its reference numeral. The ellipse immediately to the right of the first node is a representation of the image shape at position 76 between the window 73 and the region on the cylindrical reflector 13 at which image 74 is formed.

Figure 6:
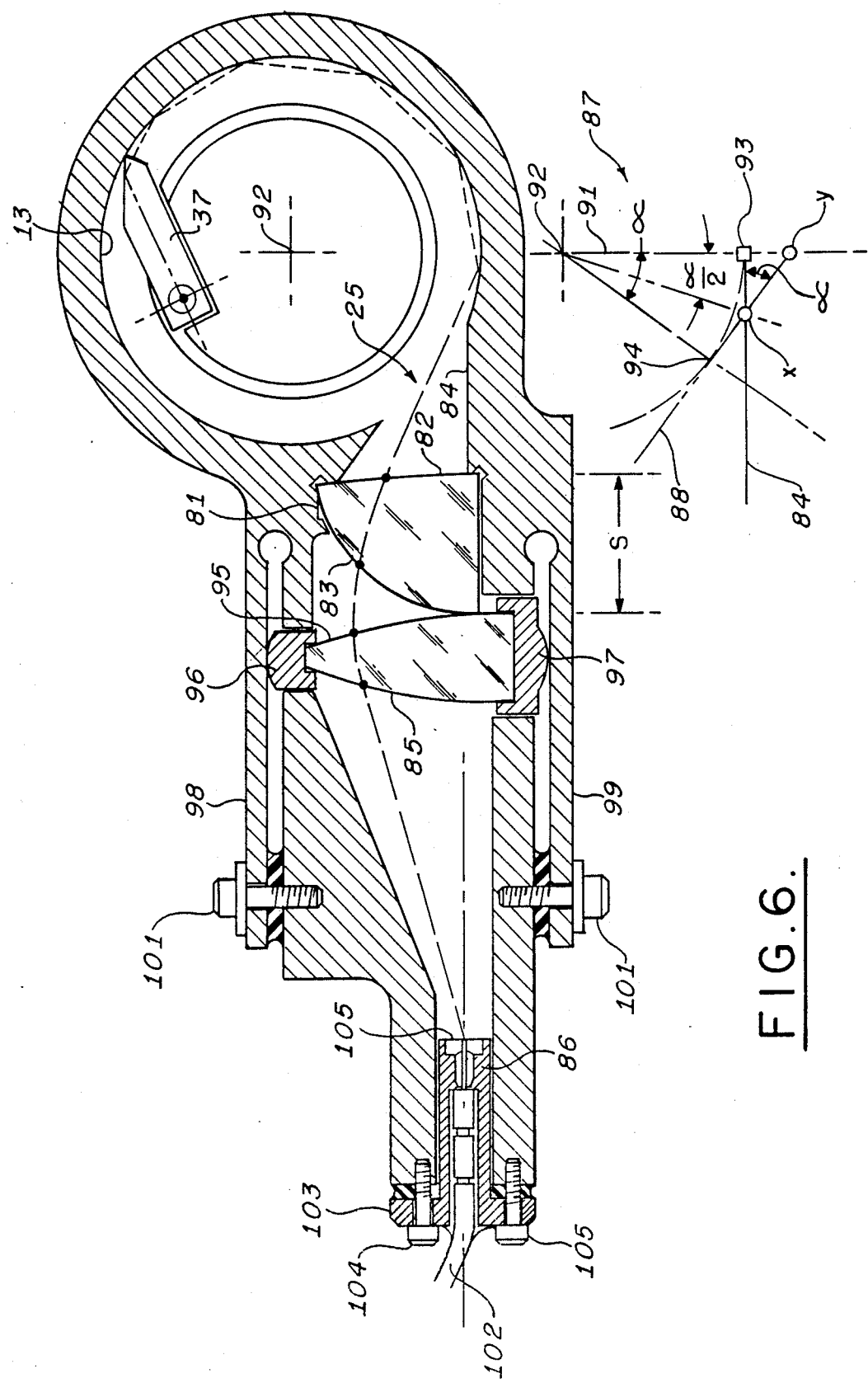
FIG. 6 is a cross-sectional view of a preferred embodiment of the invention.

The above described image-node sequence provides a defined ray set emerging from the window 25 (FIG. 5). Thus, a lens system may be supplied that focuses the rays to the face of a receiving fiber. This may be accomplished by matching the spherical aberration of the lens set with the geometric pattern of the rays emerging from the window in the cylindrical reflector 13. An optical rotary joint incorporating such a lens set is shown in FIG. 6.

A first lens 81 of the set is of an aspheric design such as that employed in a condenser lens for a projection system. Like the condenser lens, it has a short focal length for a given diameter. Unlike the condenser lens, the lens surfaces 82, 83 and the maximum spacing S between these surfaces are designed to develop spherical aberration for an approximately collimated output of the ray sets that emanate from all locations within the window 25. The axis of the lens 81 is aligned with the path 84 of the first ray of a ray set that exits through the window 25.

A second lens 85, of symmetric convex design with its axis located on the ray path 84, converges the rays from lens 81 to the face of a receiving optical fiber 86.

The lenses 81, 85 are designed and arranged to focus the rays emanating from the window 25 to the optical fiber 86 by matching the caustic at the window in a manner that directs all rays to be within the capture cone angle of the optical fiber 86.

The exiting rays may be defined in the coordinate system of the lens set with reference to the coordinate diagram 86 shown in FIG. 6. Let $\alpha$ be the input angle of a ray 88 to the lens as measured from the vertical axis 91 drawn through the rotational center 92 and the final node 93 of the exiting ray that determines the horizontal axis 84. Let x and y be the intercepts with the horizontal axis 84 and the vertical axis 91, respectively. It is readily determined that these values are:

$$x = r \tan(\alpha/2)$$

$$y = r \tan \alpha \tan(\alpha/2)$$

x being the axial spherical aberration and y being the lateral spherical aberration.

The lenses 81 and 85 may be fabricated from a single lens by removing a section of the single lens in a manner that establishes the surfaces 82, 83 85, and 95. Mounting the second lens 85 in carriers 96 and 97 and preloading the assembly between flexures 98 and 99 provides a final adjustment for focusing the rays to the optical fiber 86. Such a differential flexure arrangement may provide an adjustment sensitivity for the lens 85 assembly on the order of 60 degrees rotation/micron translation with screws 101 having a 40 pitch screw thread. The receiving fiber 102 may be mounted in a carrier 103 and its face 105 squared, flattened, and polished prior to assembly. Final focus adjustment of the carrier 103 may be with a differential screw 104 arrangement. An approximate scale factor for this configuration may be on the order of 5 degrees rotation/micron translation.

Figure 7:
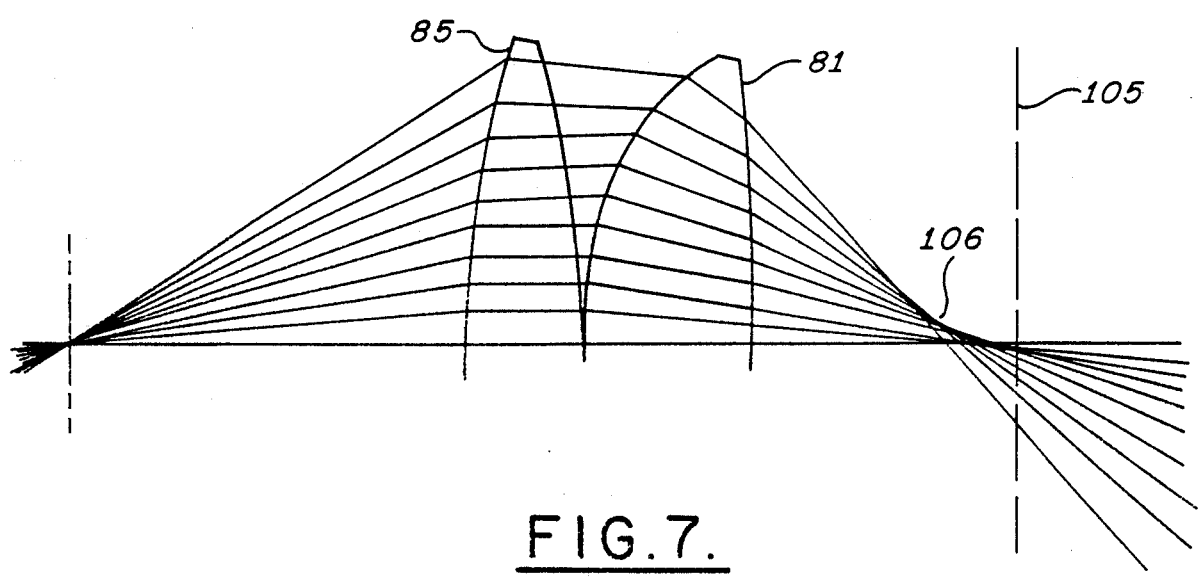
FIG. 7 is a ray diagram for the output optics of FIG. 6.

The optical rotary joint described herein provides a mechanism for transferring light rays from an input optical fiber to an output optical fiber for all rotational angles of the input optical fiber about a rotational axis. FIG. 7 shows computer derived ray paths through the lenses 81 and 85 for various angles of rotation in a typical rotary joint configuration of the invention. Also shown in FIG. 7 are the adjusted focal plane 105 and the matched caustic 106 of the lens set 81, 85.

Figure 8:
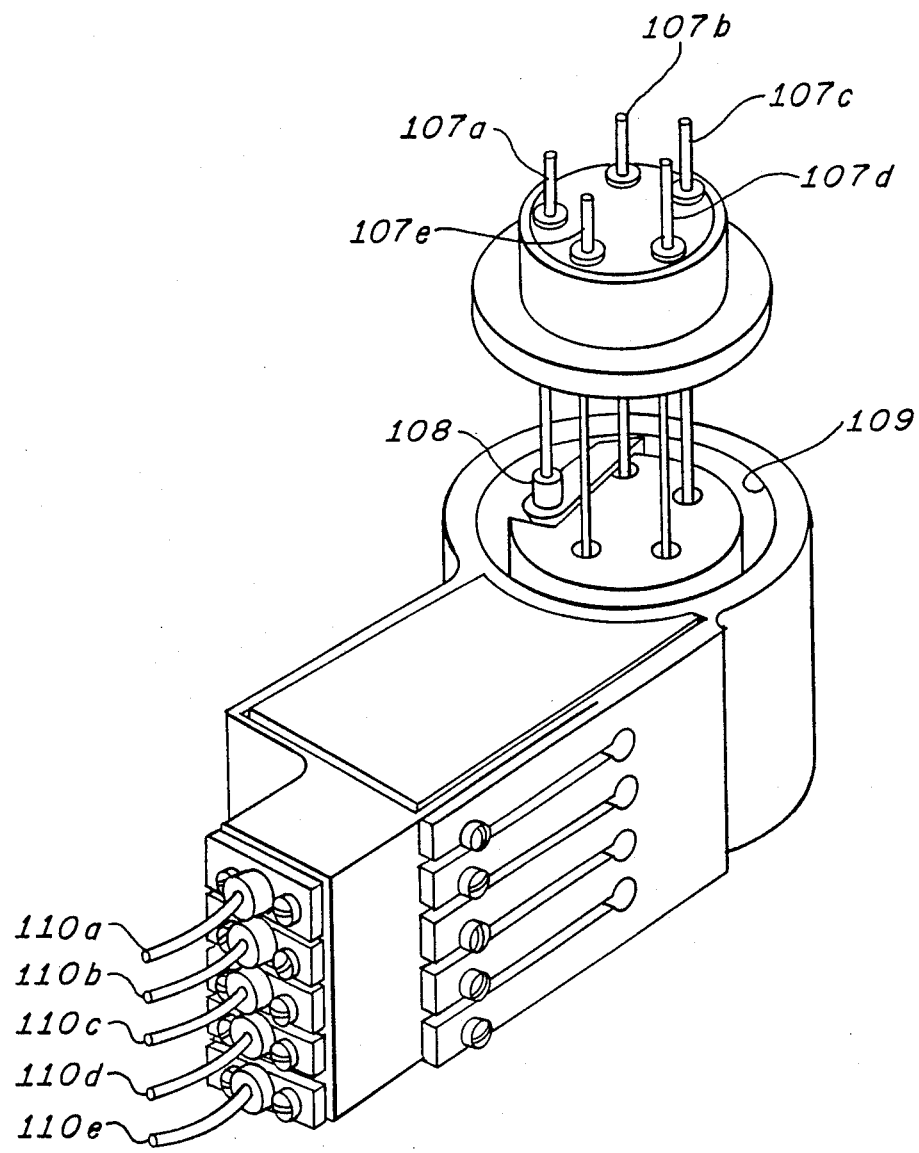
FIG. 8 is an isometric drawing of a preferred embodiment of the invention which provides multi-channel operation.

Though only a single channel has been described it should be recognized that a multi-channel rotary joint may be provided by axially stacking a plurality of channels as shown in FIG. 8. Although FIG. 8 illustrates a five channel configuration, this number is not limiting and more channels may be provided. The input fibers 107a–107e are coupled through input optical assemblies, only one of which input optical assembly 108, is shown. The input optical assemblies, which may be angularly offset from one another or vertically stacked, are mechanically linked to rotate in unison. A single cylindrical reflector 108 may be utilized by all the input optical assemblies for reflections about a cavity as previously described or sectioned cylindrical mirrors respectively associated with the input optical assemblies, may be employed. LIght rays for each beam exiting a window in the cylindrical reflector 109 are directed, as previously discussed, to output optical fibers 110a–110e, respectively associated with the input optical fibers 107a–107e.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. An optical rotary joint comprising:
   a cavity having internal cylindrical means for reflecting light about said cavity and window means extending through said cylindrical means for permitting light reflected from said cylindrical means to leave said cavity;
   first light means having an axis of rotation positioned within said cavity and coupled to said window means by light beams reflected about said cylindrical means and directly coupled to said window means when in a rotational position that is within said window means, each ray of said light beams being reflected from one point on said cylindrical means to another point on said cylindrical means, each reflection fron a reflection point to a next succeeding reflection point forming a reflection segment, each of said light beams containing one ray having reflection segments tangent to a predetermined circle of predetermined radius that is concentric with said cylindrical means, each light beam diverging from a node on said predetermined circle formed at a tangent point of said one ray and converging after each reflection to form another node at a tangent point of said one ray; and
   second light means for coupling light between said window means and a predetermined region.

2. The optical rotary joint of claim 1 wherein said reflection segments are of number N, each having an angular width of 360°/N and wherein said window means has an angular width of 360°/N.

3. The optical rotary joint of claim 1 wherein said first light means includes:
   lens means adapted to receive at least one optical fiber for coupling light beams between said at least one optical fiber and nodes on said predetermined circle.

4. The optical rotary joint of claim 3 wherein said first light means further includes a first end in light coupling relationship with said cylindrical means, an end opposite said first end, and constructed and arranged such that said end opposite said first end rotates about a preselected circle concentric with said predetermined circle.

5. The optical rotary joint of claim 4 wherein said preselected circle has a preselected radius that is smaller than said predetermined radius.

6. The optical rotary joint of claim 4 wherein said lens means is coupled to said end opposite said first end and includes:
   means for coupling light beams between a focal point and said at least one optical fiber; and
   mirror means positioned to couple light beams between said nodes and said cylindrical means.

7. The optical rotary joint of claim 1 wherein said second light means includes optical lens means positioned adjacent said window means in a light coupling relationship with said predetermined region for light traversing said window means.

8. The optical rotary joint of claim 7 further including means at said predetermined region for receiving an optical fiber and positioning a face of said optical fiber at said predetermined region.

9. The optical rotary joint of claim 8 further including means for positionally adjusting said optical lens means comprising:
   differential flexure means coupled to said optical lens means for axially and laterally adjusting said optical lens means relative to said predetermined region; and
   screw means coupled to said flexure means for generating forces to establish axial and lateral adjustment of said optical lens means.

10. An optical rotary joint in accordance with claim 7 wherein said optical lens means includes:
    aspheric lens means positioned adjacent said window means for providing collimated optical rays which match ray sets emanating from said window means; and
    focusing lens means positioned between said aspheric lens means and said second light means for focusing said collimated optical rays to said predetermined region.

11. An apparatus in accordance with claim 1 wherein said optical rotary joint has an axis of rotation and further includes means for stacking a plurality of said optical rotary joints along said axis of rotation.

12. An optical rotary joint in accordance with claim 1 wherein said first light means is constructed and arranged to be in a light exchanging relationship with nodes on said predetermined circle and includes:
    means for coupling to at least one optical fiber;
    lens means for coupling light beams between said at least one optical fiber and a focus at said nodes; and
    mirror means positioned for coupling light beams between said lens means and said cylidrical means.

13. An optical rotary joint in accordance with claim 12 wherein said second light means includes optical lens means positioned adjacent said window means for coupling light between said window means and said predetermined region.

14. An optical rotary joint in accordance with claim 13 further including means for positionally adjusting said optical lens means.

15. The optical rotary joint of claim 14 further including means at said predetermined region for receiving at least one optical fiber and positioning a face of said at least one optical fiber at said predetermined region.

16. The optical rotary joint of claim 15 wherein said adjusting means includes:
    differential flexure means coupled to said optical lens means for axially and laterally adjusting said optical lens means position relative to said predetermined region; and
    screw means coupled to said flexure means for generating forces to establish axial and lateral adjustment of said optical lens means.

17. An optical rotary joint in accordance with claim 13 wherein said optical lens means includes:
    aspheric lens means positioned adjacent said window means for providing collimated optical rays which match ray sets emanating from said window means; and
    focusing lens means positioned between said aspheric lens means and said predetermined region for focusing said collimated optical rays to said predetermined region.

* * * * *